United States Patent
Sylvia et al.

(10) Patent No.: US 7,044,001 B2
(45) Date of Patent: May 16, 2006

(54) SONIC- OR ULTRASONIC FLOWMETER

(75) Inventors: Dean Sylvia, Waxhaw, NC (US); Joe Schaffer, Greenwood, IN (US); Matthias Altendorf, Lörrach (DE); Mike Touzin, Höllstein (DE); Thomas Fröhlich, Münchenstein (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/809,708

(22) Filed: Mar. 26, 2004

(65) Prior Publication Data

US 2005/0210999 A1 Sep. 29, 2005

(51) Int. Cl.
*G01F 1/84* (2006.01)

(52) U.S. Cl. .................................... 73/861.29

(58) Field of Classification Search .............. 73/861.23, 73/861.25, 861.27, 861.28, 861.29, 861.31
See application file for complete search history.

(56) References Cited

U.S. PATENT DOCUMENTS

| | | | | |
|---|---|---|---|---|
| 4,596,133 A | * | 6/1986 | Smalling et al. | 73/861.18 |
| 4,823,612 A | * | 4/1989 | Ichino | 73/861.18 |
| 5,090,252 A | * | 2/1992 | Tschirner | 73/861.28 |
| 6,508,134 B1 | * | 1/2003 | Feller | 73/861.27 |
| 6,865,957 B1 | * | 3/2005 | Hughes et al. | 73/861.52 |
| 2003/0084732 A1 | * | 5/2003 | Ehrlich et al. | 73/861.27 |

* cited by examiner

*Primary Examiner*—Harshad Patel
(74) *Attorney, Agent, or Firm*—Bacon & Thomas (57) ABSTRACT

A sonic- or ultrasonic flowmeter, suitable for replacement of differential pressure flowmeters, comprising: a pipe segment, to be connected to a first and a second pipe, each having a diameter, which complies to an industry standard for pipe diameters used in differential pressure flow measurement, having a length (L), which is equal to a standard length for a flow restricting element of a differential pressure flowmeter, having a diameter (D), which is equal to a standard for pipe diameters used in differential pressure flow measurement, comprising a first standard connector located on a first end of the pipe segment, and a second standard connector located on a second end of the pipe segment, a primary flow sensor, comprising at least one sonic- or ultrasonic transducer for transmission and/or reception of sonic- or ultrasonic signals through the pipe segment, mounted on the pipe segment, and a sensor electronic for providing a measurement signal representing a flow of fluid through the pipe segment, based on signals received by the sonic- or ultrasonic transducers.

8 Claims, 6 Drawing Sheets

SONIC- OR ULTRASONIC FLOWMETER

TECHNICAL FIELD

The present invention relates to sonic- or ultrasonic flowmeters for substitution of differential pressure flowmeters.

BACKGROUND OF THE INVENTION

Flowmeters are commonly used devices for measuring a flow of a liquid through a pipe. In various branches of industry, for example in the chemical industry or in the pharmaceutical industry, the measurement data obtained by flowmeters is used to control complex industrial processes.

There is a wide range of flowmeters using different measurement principles on the marked, for example differential pressure flowmeters, magnetic inductive flowmeters, sonic- or ultrasonic flowmeters, coriolis or vortex flowmeters.

Electromagnetic flowmeters make use of Faraday's law of induction, which states that a voltage is induced in a conductor moving in a magnetic field. In electromagnetic flowmeters, the flowing medium corresponds to the moving conductor. The induced voltage is proportional to the flow velocity and is detected by two measuring electrodes and transmitted to the amplifier. Flow volume is computed based on the pipe's diameter. The constant magnetic field is generated by a switched direct current of alternating polarity.

Coriolis flowmeters operate on the Coriolis Effect. A mass flow dependent Coriolis force occurs when a moving mass is subjected to an oscillation perpendicular to the flow direction. The measuring system accurately determines and evaluates the resulting effects on the measuring tubes.

Vortex flowmeters operate according to Karman's vortex street principle. Vortices are created and alternate behind a bluff body. The number of vortices shed per time unit, the vortex frequency, is directly proportional to the flow rate.

Ultrasonic flowmeters use acoustic waves or vibrations of a frequency of more than 20 kHz. Depending on the design, they use either wetted or non-wetted transducers on the pipe perimeter to couple ultrasonic energy with the fluid in the pipe.

Some ultrasonic flowmeters operate on the Doppler Effect, whereby the transmitted frequency is altered linearly by being reflected from particles and bubbles in the fluid. The frequency shift is linearly proportional to the rate of flow of materials in the pipe and is used to develop a signal proportional to the flow rate.

In addition, there are flowmeters on the market, that measure the difference in transit time between ultrasonic signals, for example short ultrasonic pulses or beams, transmitted in a single path along and against the flow. Two transducers are used, one upstream of the other. Both act as transmitter and receiver for the ultrasonic signals. The flow velocity is directly proportional to the difference of the upstream and downstream transit times. A product of a cross-sectional area of the pipe and the flow velocity provides a measure of the volumetric flow.

Differential pressure flowmeters comprise a differential pressure sensor and a flow-restricting element inserted in the flow channel, for example an orifice or a nozzle. Typically, the flow-restricting element is a pipe segment of standard length, which is inserted between a first and a second pipe. The diameters of the first and the second type also comply with an industry standard for differential pressure flow measurement. In operation, a fluid to be measured flows through the first pipe, the flow-restricting element and the second pipe. Standardized forms of connections, for example flanges, are foreseen, for providing a fluid tight connection between the flow-restricting element and the first and the second pipe. According to Bernoulli's law, a moving fluid causes a pressure differential across the restriction in the flow channel. This pressure differential is proportional to a square of the volumetric flow rate.

In order to achieve good measurement accuracy it is necessary that the same flow profile occurs at the measurement point at practically all times. This requires sufficiently long straight pipe runs before and behind the measurement point in order to stabilize the flow profile.

Narrowing the flow channel by the restricting element results in a considerable nonrecoverable pressure loss in the fluid.

Despite the disadvantages involved with differential pressure flowmeters there is a reluctance to replace differential pressure flowmeters by ones that are more suitable. The standard dimensions defined in Industry for differential flowmeters allow for replacement of one differential pressure flowmeter by another. Other types of flowmeters generally do not comply with the standard dimensions for differential pressure flowmeters. Consequently, replacement of a differential pressure flowmeter by another type of flowmeter requires extensive and costly re-designs at the measurement sites.

SUMMARY OF THE INVENTION

In order to overcome the disadvantages of differential pressure flowmeters, there is a need in industry, to make it possible to exchange differential pressures flowmeters by other types of flowmeters without extensive and costly re-designs of the measurement sites.

In U.S. Pat. No. 6,101,885 a vortex flowmeter is described, that can be installed in existing measurement sites in place of a differential pressure flowmeter. Vortex flowmeters comprise a bluff body, which needs to be inserted in the pipe.

The bluff body disturbs the free flow of the fluid.

It is an object of the invention to provide a sonic- or ultrasonic flowmeter, suitable for replacement of differential pressure flowmeters.

To this end, the invention comprises a sonic- or ultrasonic flowmeter comprising:
  a pipe segment,
    to be connected to a first and a second pipe, each having a diameter, which complies with an industry standard for pipe diameters used in differential pressure flow measurement,
    having a length, which is equal to a standard length for a flow restricting element of a differential pressure flowmeter,
    having a diameter, which is equal to a standard for pipe diameters used in differential pressure flow measurement,
    comprising a first standard connector located on a first end of the pipe segment and a second standard connector located an a second end of the pipe segment,
  a primary flow sensor,
    comprising at least one sonic- or ultrasonic transducer for transmission and/or reception of sonic- or ultrasonic signals through the pipe segment, mounted on the pipe segment, and a sensor electronic for providing a measurement signal representing a flow of a fluid through the pipe segment, based on signals received by the sonic- or ultrasonic transducers.

According to a refinement of the invention, the first and the second standard connector are flanges or pipe sections, which are to be welded onto ends of the first and the second pipe.

According to a further refinement, the ultrasonic transducers are inserted in opposing bores in the pipe segment.

According to another refinement, the ultrasonic transducers are mounted on opposing outside walls of the pipe segment.

According to a further refinement, the sonic- or ultrasonic flowmeter comprises a housing for the sensor electronic, which is mounted on the pipe segment.

According to another refinement, the sonic- or ultrasonic flowmeter comprises
 a housing for the sensor electronic,
 a mounting section located on an outside wall of the housing for mounting the housing apart from the pipe segment, and
 a cable connector located on an outside wall of the housing, for connecting the sonic- or ultrasonic transducers to the sensor electronic.

According to another refinement, the sonic- or ultrasonic flowmeter comprises
 a housing for the sensor electronic, and
 a mounting section located on an outside wall of the housing for mounting the housing apart from the pipe segment,
  comprising two pairs threaded bores, wherein the bores form a rectangle and their position is equal to a position of threaded bores in normed oval flanges of differential pressure transducers.

According to a refinement, of the last mentioned refinement, a cable connector for connecting a sonic- or ultrasonic transducer is located between the threaded bores of each pair of threaded bores.

The invention and further advantages are explained in more detail using the figure of the drawing, in which four exemplary embodiments are shown.

DETAILED DESCRIPTION OF THE DRAWINGS

Figure 1:
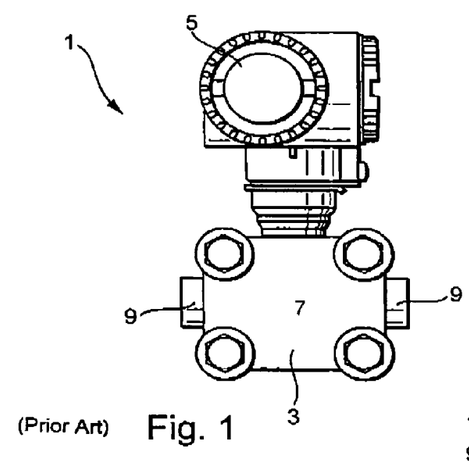
FIG. 1 shows a schematic diagram of a differential pressure transducer.

It is an object of the invention to provide a sonic- or ultrasonic flowmeter, suitable for replacement of differential flowmeters. Differential pressure flowmeters used in industry comprise a differential pressure transducer 1. FIG. 1 shows an example for differential pressure transducer 1. It comprises a differential pressure sensor, which is enclosed in a sensor block 3 and transmitter electronics, which is enclosed in a housing 5. The housing 5 is mounted on the sensor block 3. The sensor block 3 is shown in more detail in FIG. 2. The differential pressure sensor is enclosed between two side flanges 7 of rectangular cross-section, which are bolted together. Each side flange 7 has two oval flanges 9, which are located on two opposing narrow stern-faces of the respective side flanges 7. Each oval flange 9 comprises a pair of two threaded bores 11 for mounting the differential pressure transducer 1 on a measurement site. A pressure inlet port 13 is included between the threaded bores 11 of each pair. The position of the threaded bores 11 and the pressure inlet ports 13 comply with an industry standard. The bores 11 form a rectangle with standardized side length.

In differential pressure flow measurement a flow-restricting element 15 is inserted in a flow channel and a pressure differential across the restriction in the flow channel is measured with the differential pressure transducer 1. This pressure differential is proportional to a square of the volumetric flow rate.

Figure 3:
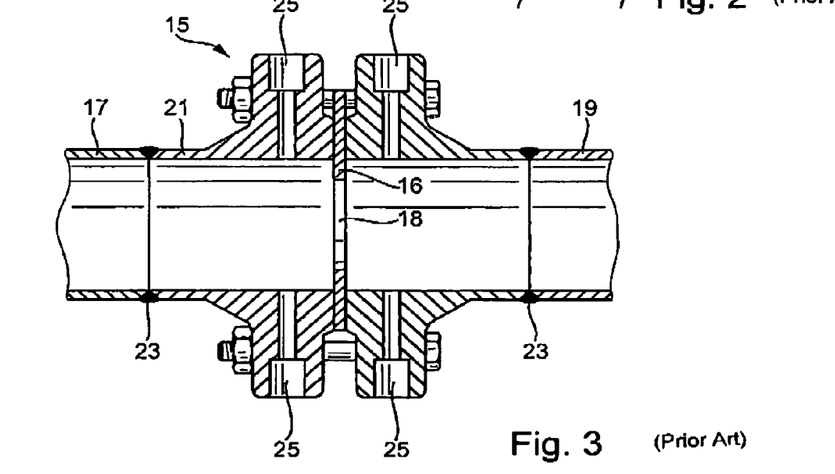
FIG. 3 shows a flow-restricting element for differential pressure flow measurement.

FIG. 3 shows a cross-sectional view of a flow-restricting element 15. In the embodiment shown, the flow-restricting element 15 is an orifice plate 16, which is permanently installed between a first and a second pipe 17, 19.

Typically the flow restricting element 15, is a pipe segment 21 of standard length L, for example 65 mm, which is inserted between the first and the second pipe 17, 19. The diameters of the first and the second type 17, 19 also comply with an industry standard for differential pressure flow measurement. Standard diameters are for example 15 mm or 100 mm. The inner diameter of the pipe segment 21 is equal to the diameters of the pipes 17, 19. The pipe segment 21, the first and the second pipe 17, 19 form a flow channel of constant diameter, which is restricted in the region of the orifice plate 16. The orifice plate 16 is located approximately in the middle of the pipe segment 21 and has a central bore 18 with a smaller diameter than the insides of the pipe segment 21.

Standardized forms of connections 23, for example flanges or weld-connections, are foreseen, for providing a fluid tight connection between the flow restricting element 15 and the first and the second pipe 17, 19. In the embodiment shown in FIG. 3, the flow-restricting element 15 is butt-welded onto the first and the second pipe 17, 19.

The pipe segment 21 comprises two radial bores 25 on either side of the orifice plate 16. In operation, at least one of the radial bores 25 on either side of the orifice plate 16 is connected to a respective pressure inlet port 13 of the differential pressure transducer 1. These connections can be made in various conventional ways, which are not illustrated here. The differential pressure transducer 1 can be mounted directly onto the pipe segment 21 using the threaded bores 11 of the oval flanges 9, or it can be mounted for example on a mounting panel located apart from the pipe segment 21.

The remaining unused radial bores 25 have to be closed fluid-tight, which is not illustrated either.

Figure 4:
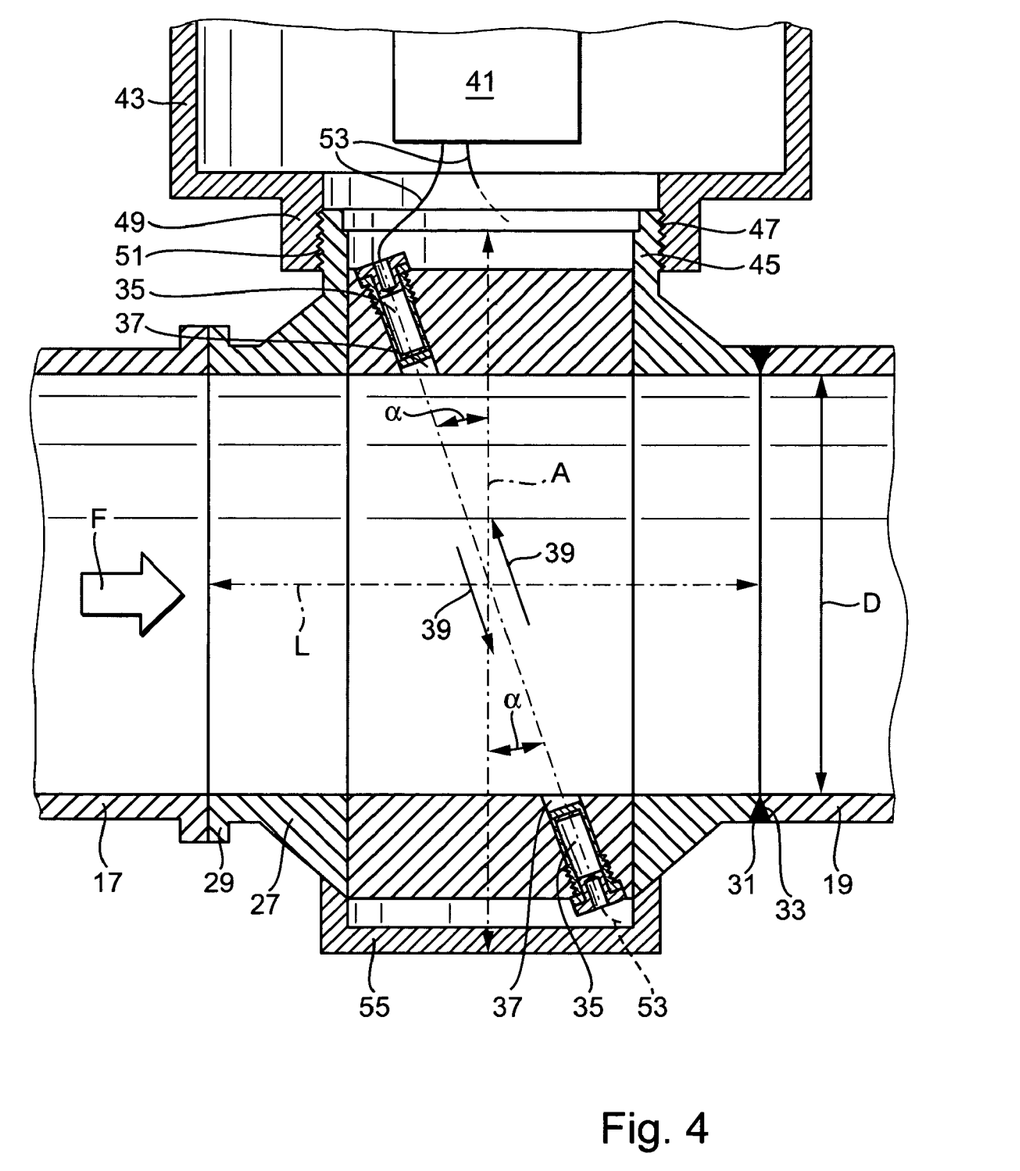
FIG. 4 shows a compact sonic- or ultrasonic flowmeter according to the invention, comprising sonic- or ultrasonic transducers, which are inserted in a pipe segment.

FIG. 4 shows a first embodiment of a sonic- or ultrasonic flowmeter, for replacement of a differential pressure flowmeter, according to the invention. It comprises a pipe segment 27, to be connected to a first pipe 17 and a second pipe 19. The pipe segment 27, the first pipe 17, and the second pipe 19 have a diameter D, which complies to an industry standard for pipe diameters used in differential pressure flow measurement, for example a diameter D of 15 mm, 100 mm or 150 mm.

The pipe segment 27 has a length L, which is equal to a standard length for a flow-restricting element of a differential pressure flowmeter, for example a length L of 65 mm.

The pipe segment 27 comprises a first standard connector 29 located on a first end of the pipe segment 27 and a second standard connector 31 located on a second end of the pipe segment 27. In the embodiment shown two types of standard connectors 29, 31 are illustrated. The first standard connector 29 is a flange, which is fluid-tightly fixed to a corresponding counter-flange 33 of the first pipe 17. The second standard connector 31 is a pipe sections, which is welded onto an end 33 of the second pipe 19.

The sonic- or ultrasonic flowmeter comprises a primary flow sensor, comprising at least one sonic- or ultrasonic transducer 35 for transmission and/or reception of ultrasonic signals 39 through the pipe segment 27. In the embodiment shown in FIG. 4 two sonic- or ultrasonic transducers 35 are foreseen, which are inserted in opposing bores 37 in the pipe segment 27. One sonic- or ultrasonic transducer 35 is located upstream of the other. They are inserted such that their longitudinal axis encloses an angle $\alpha$ with an axis A perpendicular to a direction of flow F of the fluid through the pipe segment 27. Given the diameter D and the length L of the pipe segment 27, the sonic- or ultrasonic transducers 35 are positioned, such that the angle $\alpha$ is as large as possible, because the measuring effect is proportional to $\sin(\alpha)$.

In the embodiment shown, both sonic- or ultrasonic transducers 35 act as transmitters and receivers for ultrasonic signals 39. In operation, each sonic- or ultrasonic transducer 35 transmits a sonic- or ultrasonic signal 39, for example a short sonic- or ultrasonic pulse or beam, across the pipe segment 27. The signal 39 is received by the opposing sonic- or ultrasonic transducer 35.

The sonic- or ultrasonic flowmeter comprises a sensor electronic 41, for providing a measurement signal representing a flow of a fluid through the pipe segment 27, based on signals received by the sonic- or ultrasonic transducers 35.

The sonic- or ultrasonic transducers 35 can for example comprise piezoelectric ceramics for generation and reception of sonic- or ultrasonic signals 39. Disc shaped piezoelectric elements having a diameter of less than 20 mm can for example be used for generation and reception of sonic- or ultrasonic signals having a frequency range from 0.5 MHz to 10 MHz. When a thickness oscillation mode of the disc is used, a resonance frequency of the piezoelectric disc depends on a thickness of the disc. It is also possible to make use of radial modes of oscillation.

The frequency used is preferably chosen, depending on the measurement application. Gas flows can for example be measured using frequencies in the range of 100 kHz and liquid flows can for example be measured using frequencies ranging from 500 kHz up to 2 MHz.

If required, piezoelectric elements can be used, which can be exposed to high temperatures.

In the embodiment shown in FIG. 4 a housing 43 for the sensor electronic 41 is mounted directly on the pipe segment 27. To this extend a hollow cylindrical connector element 45 is foreseen on the pipe segment 27. It extends radially outward and comprises an external thread 47. The housing 43 comprises a corresponding tubular section 49 with an internal thread 51 and is screwed onto the connector element 45. Other forms of mounting the housing 43 onto the pipe segment 27 known in the art can also be used.

The sonic- or ultrasonic transducers 35 are connected to the sensor electronic 41 by connecting lines 53. Preferably, the connector element 45 is located near one of the sonic- or ultrasonic transducers 35, such that the connecting line 53 of that sonic- or ultrasonic transducer 35 leads from the sonic- or ultrasonic transducer 35 into the connector element 45. A tubular sleeve 55 is foreseen, which encloses a section of the pipe segment 27 including the sonic- or ultrasonic transducers 35. It serves as a conduit for the connecting line 53 of the remaining sonic- or ultrasonic transducer 35 and leads into the connector element 45, through which the sonic- or ultrasonic transducers 35 are connected to the sensor electronic 41. Signals of the sonic- or ultrasonic transducers 35 are supplied to the sensor electronic 41 for determining the flow.

The flow can for example be determined by measuring a difference in transit time between sonic- or ultrasonic signals 39 transmitted in a single path along and against the flow. The flow velocity is directly proportional to the difference of the upstream and downstream transit times. A product of a cross-sectional area of the pipe and the flow velocity provides a measure of the volumetric flow.

The invention is not limited to this type of sonic- or ultrasonic flow measurement. It is also possible to measure the flow using the Doppler Effect, as described above.

Preferably, the sensor electronic 41 comprises a signal processing unit including a microprocessor and a memory for storing a flow calculation program. The flow is calculated by running the flow calculation program on the microprocessor.

The signal processing unit can be set to produce a signal proportional to the flow rate or to the square of the flow rate. The setting is preferably stored in a memory accessible to the microprocessor. When the signal processing unit is set to produce a signal proportional to the square of the flow rate the square of the flow rate is calculated by the microprocessor.

The signal processing unit provides its signal to an output signal generator for generating an output signal proportional to the signal of the signal processing unit.

Various forms of output signals are feasible. Preferably, an industry standard, for example a signal current between 4 mA and 20 mA, a signal according to the HART standard, or a standardized bus signal, for example according to field bus foundation standards or profibus, is generated.

Preferably, the flowmeter comprises a communication interface, allowing a user to set the output signal to be proportional to the flowrate or the square of the flow rate. The setting is then stored in the memory.

Thus, it is possible to generate an output signal proportional to the flow rate or the square of the flow rate. This allows replacement in particular of older differential pressure flowmeters, showing this form of output signal, without extensive reprogramming of process control units.

Since the length of the pipe segment 27 and its diameter comply with the corresponding standard dimensioned for flow restricting elements used in differential pressure flowmeters, the sonic- or ultrasonic flowmeter according to the invention can be used to replace differential pressure flowmeters on site, without any alterations on the measurement site.

Figure 5:
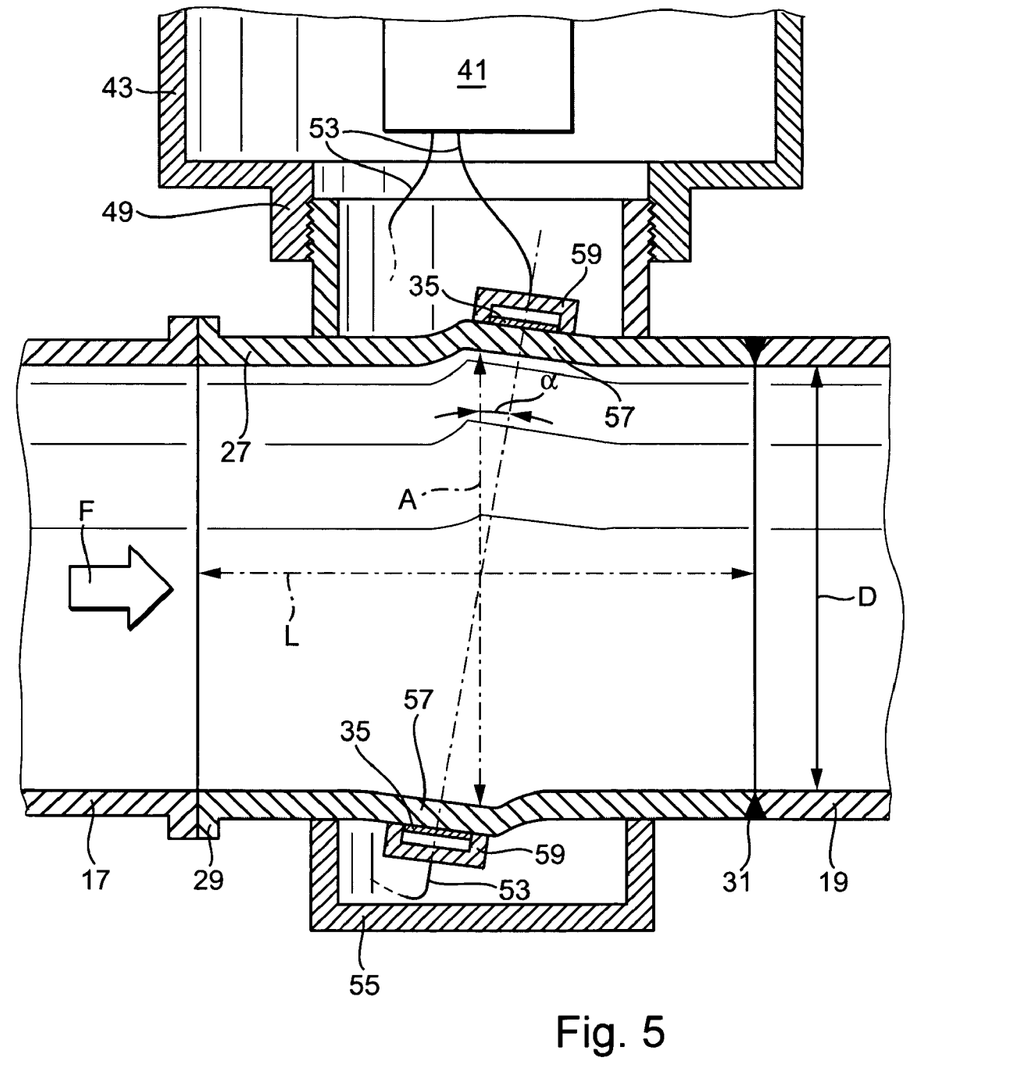
FIG. 5 shows a compact sonic- or ultrasonic flowmeter according to the invention, comprising sonic- or ultrasonic transducers, which are mounted onto outside walls of a pipe segment.

FIG. 5 shows another embodiment of a sonic- or ultrasonic flowmeter according to the invention. It is very similar to the embodiment shown in FIG. 4. Thus, only the existing differences are described in more detail below.

The main difference to the previously described embodiment is that the sonic- or ultrasonic transducers 35 are mounted on an outside wall of the pipe segment 27. They can for example be clamped onto an outside wall 57 of the pipe segment 27. Alternatively, the sonic- or ultrasonic transducers 35 can be held in place by plastic housings 59, which are molded onto the pipe segment 27 and enclose the sonic- or ultrasonic transducers 35, as is shown in FIG. 5. Whereas in the pipe segment 27 of the previously described embodiment had rather thick walls to allow the insertion of the sonic- or ultrasonic transducers 35, the wall sections 57 are thinner in order to allow transmission of sonic- or ultrasonic signals through the wall sections 57. They have for example a thickness of several millimeters.

Preferably a design, as shown in FIG. 4, is used, where the wall sections 57 form opposing surfaces, such that a direct line perpendicular to the surfaces between them encloses an angle α with an axis A perpendicular to a direction of flow F of the fluid through the pipe segment 27. Such a design is described in more detail in a European Patent Application Number 0302 3354.8 filed on Oct. 23, 2002 by the assignee, which is incorporated herein by reference.

Figure 6:
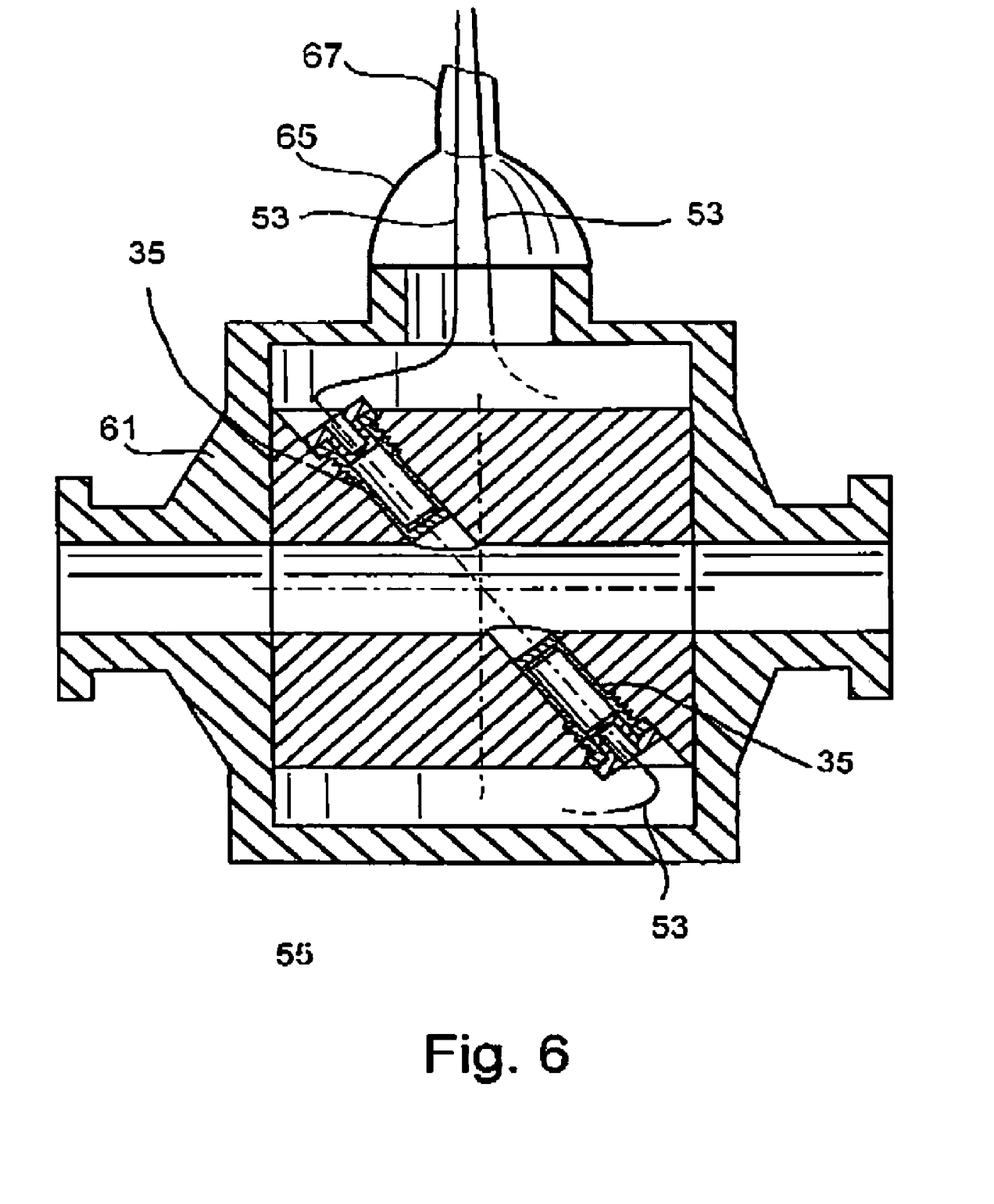
FIG. 6 shows a pipe segment including sonic- or ultrasonic transducers, according to the invention, for use in combination with a remotely located housing.
Figure 7:
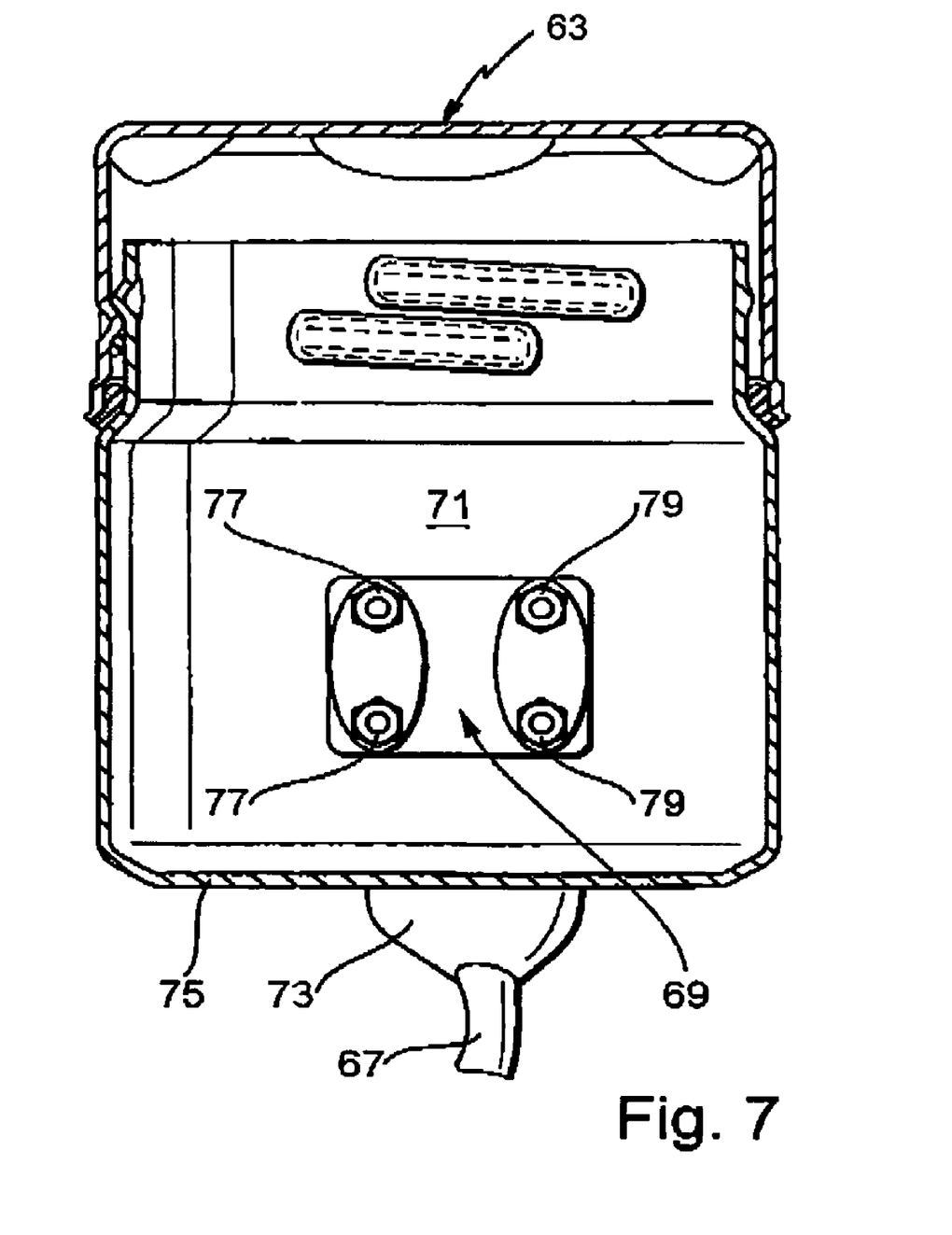
FIG. 7 shows a housing for use in combination with the pipe segment and the sonic- or ultrasonic transducers according to FIG. 6.

FIGS. 6 and 7 show a further embodiment of a sonic- or ultrasonic flowmeter according to the invention. Again, only the differences between the previously described embodiments are described in more detail below. FIG. 6 shows a cross section of a pipe segment 61, which is almost identical to the one shown in FIG. 4. The only difference is that it is designed to be used in combination with a housing 63, as for example shown in FIG. 7, which is to be mounted apart from the pipe segment 61.

A cable feed through 65 is foreseen replacing the connector element 45 shown in FIG. 4. The connecting lines 53 of the ultrasonic transducers 35 lead from the sonic- or ultrasonic transducers 35 into the cable feed through 65. Again a tubular sleeve 55 is foreseen. The connecting line 53 of the sonic- or ultrasonic transducer 35, which is located on the wall opposite the cable feed trough 65 runs through the sleeve 55.

On site, a cable 67 is foreseen, that connects the connecting lines 35 to the sensor electronic 41, not shown in FIG. 7, inside the remotely located housing 63. The housing 63 comprises a mounting section 69 located on an outside wall 71 of the housing 63 for mounting the housing 63 apart from the pipe segment 61. In the embodiment shown, the outside wall 71 is a sidewall of the housing 63.

In addition a cable connector 73 is foreseen, which is located on an outside wall 75 of the housing 63. In the embodiment shown, the outside wall 75 is a bottom wall of the housing 63. Inside the housing 63, a connection is foreseen between the cable connector 73 and the sensor electronic 41. In operation, the cable 67 is connected to the cable connector 73 for connecting the sonic- or ultrasonic transducers 35 to the sensor electronic 41.

Figure 2:
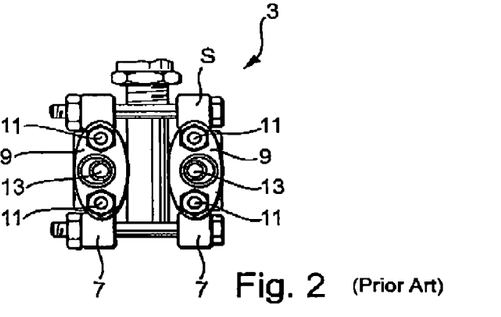
FIG. 2 shows a sensor block of the differential pressure transducer shown in FIG. 1.

Preferably, the mounting section 69 comprising two pairs of threaded bores 77, 79, wherein the bores 77, 79 form a rectangle. Their position with respect to each other is equal to a position of the threaded bores 11 in normed oval flanges 9 of differential pressure transducers 1, an example of which is shown in FIG. 2.

This design allows for the housing 63 to be mounted on mounting racks or wall mountings for differential pressure transducers. When replacing an already installed differential pressure flowmeter by this type of sonic- or ultrasonic flowmeter according to the invention, the existing mounting facilities on the measurement site can be used. No alterations are necessary.

Figure 8:
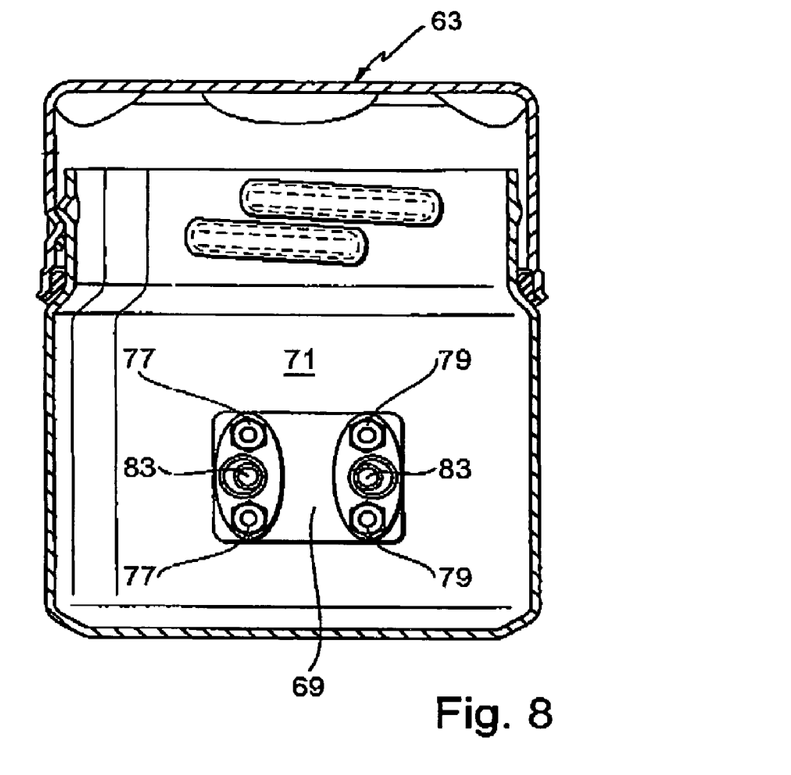
FIG. 8 shows another embodiment of a remotely located housing according to the invention.
Figure 9:
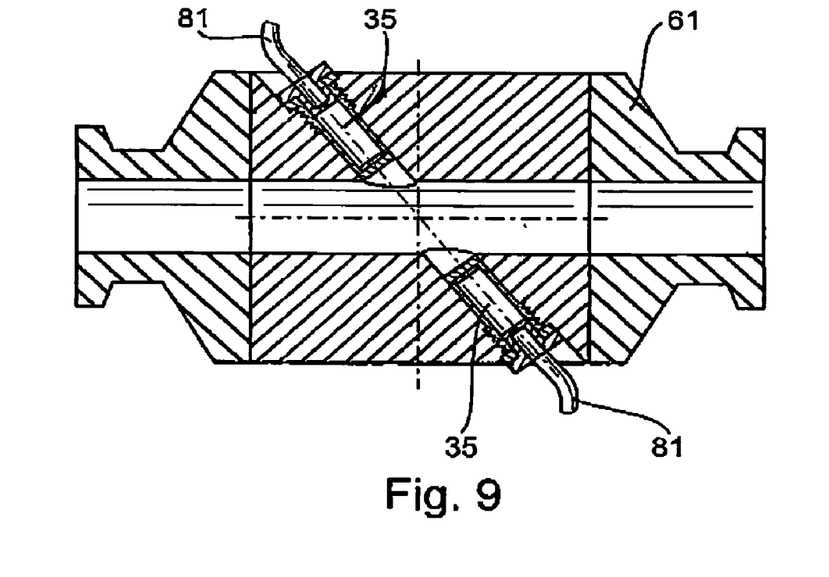
FIG. 9 shows a pipe segment including sonic- or ultrasonic transducers, according to the invention, for use in combination with the housing shown in FIG. 8.

FIGS. 8 and 9 show a variation of the embodiment shown in the FIGS. 6 and 7. Again, the housing 63 is located apart from the pipe segment 61 and the sonic- or ultrasonic transducers 35 are mounted on the pipe segment 61 according to the invention. Connecting lines 81 of the sonic- or ultrasonic transducers 35 are run directly from the sonic- or ultrasonic transducers 35 to the housing 63.

On the outside wall of the housing 63 mounting section 69 is foreseen comprising two pairs threaded bores 77, 79, wherein the bores 77, 79 form a rectangle. Their position with respect to each other is equal to a position of the threaded bores 11 in normed oval flanges 9 of differential pressure transducers 1, an example of which is shown in FIG. 2.

Instead of the cable connector 73 on the outside wall 75 as shown in FIG. 7, a cable connector 83 for connecting each sonic- or ultrasonic transducer 35 is located between the threaded bores 77, 79 of each pair of threaded bores 77, 79. Inside the housing 63, a connection is foreseen between the cable connector 83 and the sensor electronic 41, not shown in FIG. 8. In operation, the connecting lines 81 of the sonic- or ultrasonic transducers 35 are connected to the cable connectors 83.

It is possible to mount additional temperature and/or pressure sensors on or inside the pipe segments of the sonic- or ultrasonic flowmeters according to the invention. Measurement data obtained by these additional sensors, can for example be used for calibration and/or temperature and/or pressure compensation of the flow measurement.

A velocity of the sonic- or ultrasonic signals 39 depends on a density of the product flowing through the pipe segment 27, 61. It is possible to measure this velocity and to perform massflow calculations based on the volume flow measurement. If the sonic- or ultrasonic transducers 35 are in direct contact with the product, the device could even be selfcalibrating given the dimensions of the sensing element.

What is claimed is:

1. A sonic- or ultrasonic flowmeter which replaces a differential pressure flowmeter, comprising:

a pipe segment connected to a first pipe and to a second pipe, each having a diameter, which complies with an industry standard for pipe diameters used in differential pressure flow measurement, a length, which is equal to a standard length for a flow restricting element of a differential pressure flowmeter, and a diameter, which is equal to a standard for pipe diameters used in differential pressure flow measurement;

a first standard connector located on a first end of said pipe segment and a second standard connector located on a second end of said pipe segment;

a primary flow sensor, comprising at least one sonic- or ultrasonic transducer for the transmission and/or reception of sonic- or ultrasonic signals across said pipe segment, said at least one sonic- or ultrasonic transducer being mounted on said pipe segment;

sensor electronics connected to said primary flow sensor for providing the measurement signal representing a flow of a fluid through said pipe segment, based on the sonic- or ultrasonic signals received by said sonic- or ultrasonic transducers;

a housing for said sensor electronics; and a mounting section located on an outside wall of said housing for mounting said housing apart from said pipe segment, said mounting section comprising two pairs of threaded bores, wherein:

said threaded bores form a rectangle and their position is equal to a position of threaded bores in the normal oval flanges of differential pressure transducers.

2. The sonic- or ultrasonic flowmeter according to claim 1, wherein:

said first standard connector and said second standard connector are flanges or pipe sections, which are to be welded onto ends of the first pipe and the second pipe.

3. The sonic- or -ultrasonic flowmeter according to claim 1, wherein:

said sonic- or ultrasonic transducers are inserted in opposing bores in said pipe segment.

4. The sonic- or ultrasonic flowmeter according to claim 1, wherein:

said sonic- or ultrasonic transducers are mounted on opposing outside walls of said pipe segment.

5. A sonic- or ultrasonic flowmeter which replaces a differential pressure flowmeter, comprising:

a pipe segment connected to a first pipe and to a second pipe, each having a diameter, which complies with an industry standard for pipe diameters used in differential pressure flow measurement, a length, which is equal to a standard length for a flow restricting element of a differential pressure flowmeter, and a diameter, which is equal to a standard for pipe diameters used in differential pressure flow measurement;

a first standard connector located on a first end of said pipe segment and a second standard connector located on a second end of said pipe segment;

a primary flow sensor, comprising at least one sonic- or ultrasonic transducer for the transmission and/or reception of sonic- or ultrasonic signals across said pipe segment, said at least one sonic- or ultrasonic transducer being mounted on said pipe segment;

sensor electronics connected to said primary flow sensor for providing the measurement signal representing a flow of a fluid through said pipe segment, based on the sonic- or ultrasonic signals received by said sonic- or ultrasonic transducers;

a housing for said sensor electronics;

a mounting section located on an outside wall of said housing for mounting said housing apart from said pipe segment, said mounting section comprising two pairs of threaded bores; and a cable connector for connecting said sonic- or ultrasonic transducers is located between said threaded bores of each pair of threaded bores, wherein said threaded bores form a rectangle and their position is equal to a position of threaded bores in the normal oval flanges of differential pressure transducers.

6. The sonic- or ultrasonic flowmeter according to claim 5, wherein:

said first standard connector and said second standard connector are flanges or pipe sections, which are to be welded onto ends of the first pipe and the second pipe.

7. The sonic- or-ultrasonic flowmeter according to claim 5, wherein:

said sonic- or ultrasonic transducers are inserted in opposing bores in said pipe segment.

8. The sonic- or ultrasonic flowmeter according to claim 5, wherein:

said sonic- or ultrasonic transducers are mounted on opposing outside walls of said pipe segment.

* * * * *